Figure 3:
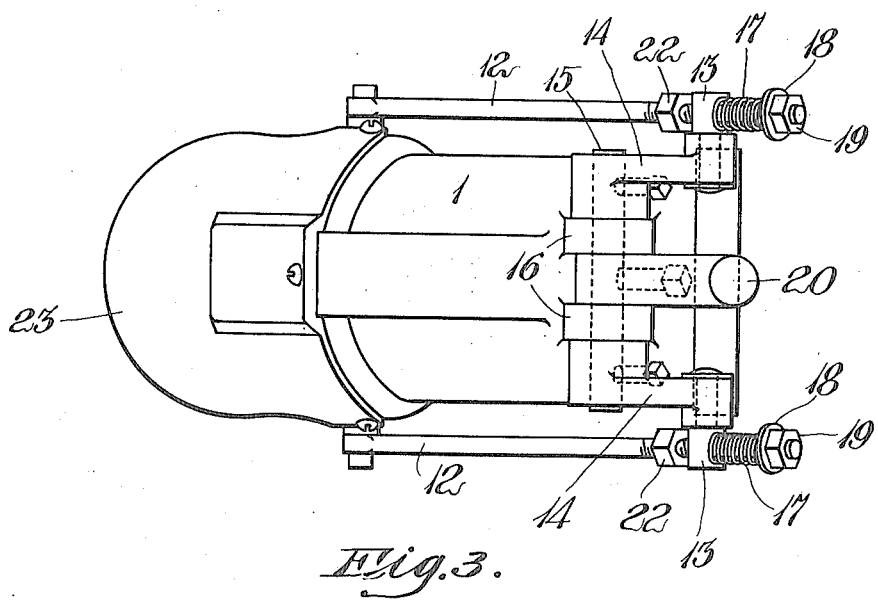

A. E. SMITH.
VALVE.
APPLICATION FILED SEPT. 20, 1913.
1,123,813.
Patented Jan. 5, 1915.
2 SHEETS—SHEET 1.
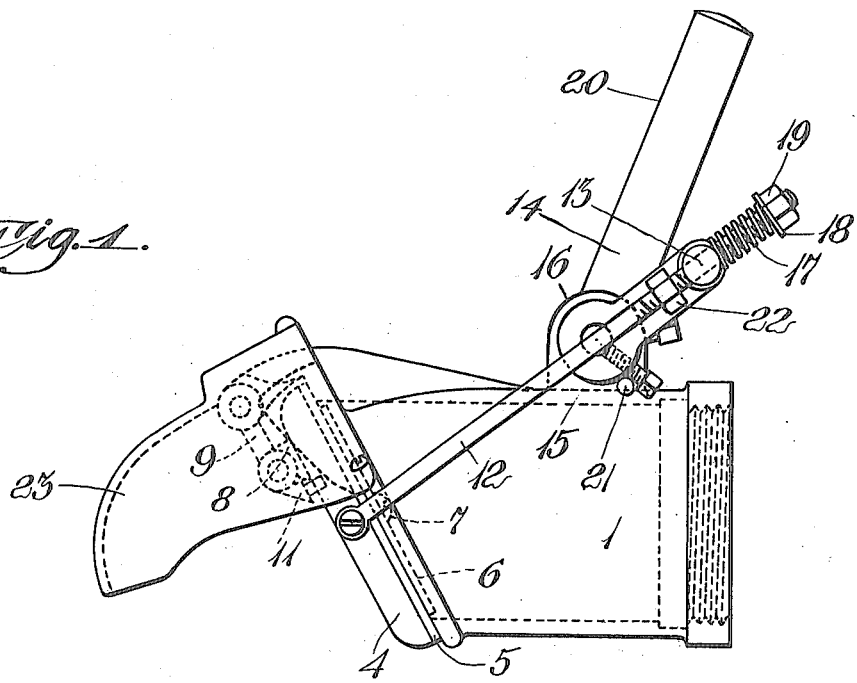
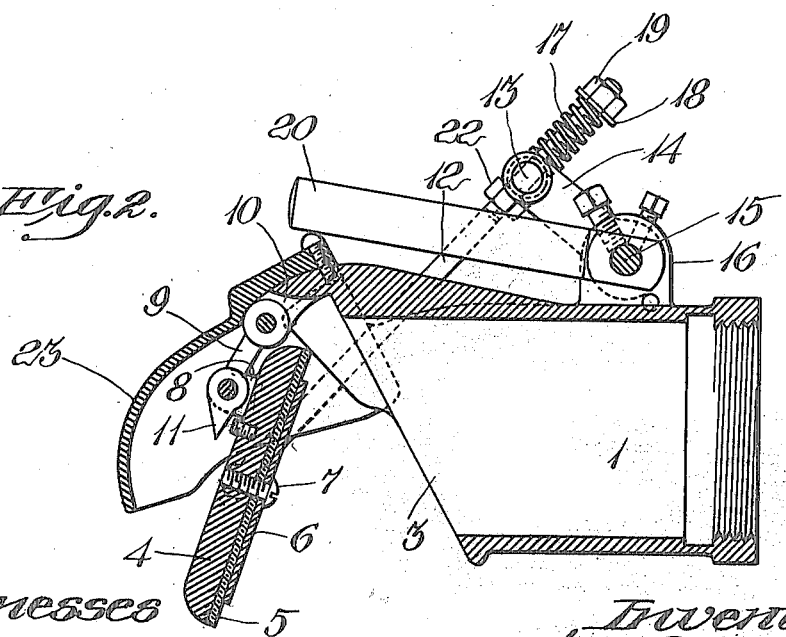

UNITED STATES PATENT OFFICE.

ALFRED E. SMITH, OF BOSTON, MASSACHUSETTS.

VALVE.

1,123,813.　　　　Specification of Letters Patent.　　Patented Jan. 5, 1915.

Application filed September 20, 1913. Serial No. 790,888.

*To all whom it may concern:*

Be it known that I, ALFRED E. SMITH, a citizen of the United States, residing at Boston, in the county of Suffolk and State of Massachusetts, have invented certain new and useful Improvements in Valves; and I do hereby declare the following to be a full, clear, and exact description of the invention, such as will enable others skilled in the art to which it appertains to make and use the same.

The present invention relates to an improvement in valves or gates.

The objects of the invention are to produce a valve of improved construction and operation having the capacity of quick opening to full pipe area, quick closing, absence of portions liable to catch dirt and thereby interfere with the opening or the seating of the valve, and other features of construction hereinafter described.

To these ends the invention consists in the valve hereinafter described and particularly defined in the claims.

In the accompanying drawings illustrating the preferred form of the invention, Figure 1 is a side elevation showing the valve closed; Fig. 2 is a sectional elevation showing the valve open; and Fig. 3 is a plan of the valve in closed position.

The illustrated embodiment of the invention is described as follows:—

The body 1 of the valve is screwthreaded at its end to screw on a pipe or nipple. The valve mouth or orifice 3 is arranged at an angle to the axis of the valve body and has a plane valve seat around it. The valve disk 4 for closing the valve orifice is provided with a rubber packing disk 5 secured by a follower 6 to the disk 4, a screw 7 passing through the follower and taking into the disk to hold the packing in place. The valve disk 4 is provided with two ears 8 between which one end of a link 9 is pivoted. The other end of the link 9 is pivotally mounted on the ears 10 projecting forward from the upper side of the valve body 1. The link 9 upon its lower end is provided with a projection 11 which is adapted to engage the outside surface of the valve disk 4 so as to cause the disk, when drawn toward its seat, to be presented squarely to the seat. To the sides of the disk are pivotally attached links 12 which extend rearwardly and upwardly and pass through holes in the crank pins 13 supported in the crank arms 14 mounted upon the opposite ends of the rock shaft 15 which is supported in the ears 16 projected upward from the upper side of the valve body. Beyond the crank pins 13 the links 12 are embraced by spiral springs 17 which engage the crank pins 13 at their lower ends and the washers 18 at their upper ends, the nuts 19 taking the spring pressure. A handle 20 is mounted on the rock shaft 15 between the ears 16, and the cranks 14 and the handle 20 are secured to the rock shaft by set screws. When the handle 20 is moved from the position shown in Fig. 2 to the position shown in Fig. 1, the links 12 are pulled upon and act to draw the valve disk 4 to its seat on the valve body. The above described arrangement is such that the links 12 and crank arms 14 form a toggle acting when the valve is closed to lock it closed, the links 12 passing slightly beyond the center of the rock shaft 15. Pins 21 engage the set screws in the arms 14 and limit the locking throw of the handle 20. Nuts 22 on the links 12 are tightly held in position thereon and act as abutments for the crank pins 13 during the opening of the valve, thus, when the handle 20 is moved from the position shown in Fig. 1 to the position shown in Fig. 2, the crank pins 13 engage the nuts 22 and transmit pressure to the links 12, so as thereby positively to move the valve disk in the direction to open it.

The extreme end of the valve body is provided with a hood 23 secured thereon by screws, which prevents upward squirting or spattering of liquid issuing from the orifice of the valve.

It will be observed that the present valve is free from cavities or projections which would catch or collect sediment or solid material being discharged through the valve, and that the liquid discharged through the valve does not run with pressure over the valve seat whereby erosion of the seat is avoided and the durability of the valve enhanced. The valve disk is held to its seat by a resilient linkage having provision for the regulation of the closing pressure. With the gradual thinning of the packing disk 5 by use, the readjustment of the linkage by which the valve is operated is not necessitated, as the yielding of the springs 17 compensates for such gradual thinning of the packing disk. In this connection it is to be observed that the packing disk may be renewed without dismantling the valve by simply removing the follower, putting on a new packing disk and replacing the follower in position. The mouth of the valve being inclined to the axis of the valve body, the pull of the links on the valve disk is substantially in a direction at right angles to the valve seat, so the valve is securely held to its seat and at the same time a movement through a comparatively small arc is sufficient to move the valve from its seat a distance such that the full area of the pipe is opened.

This valve is particularly adapted for use in connection with washing machines for laundries, by reason of the features of construction hereinbefore referred to, and particularly because it opens to full area quickly, closes quickly, holds the valve closed with a yielding pressure so that even when the packing has become worn the valve is tightly closed, does not collect any sediment upon the valve seat, nor subject such seat to erosive action of the liquids, and at the same time it is securely closed and locked by a simple and quickly performed movement of the handle.

Having thus described the invention, what is claimed is:—

1. A valve having, in combination, a valve body having a straight passage terminating in an inclined external mouth, a valve disk supported on a pivot outside of the valve body, a rock shaft mounted on the exterior of the valve body and provided with crank arms, and links connecting the valve disk and the crank-arms, substantially as described.

2. A valve having, in combination, a valve body having a straight passage terminating in an inclined external mouth, a valve disk, pivotal supporting means for the disk located on the end of the valve body and external to it, a rock shaft mounted on the outside of the valve body and provided with crank arms, links connecting the valve disk and the crank arm provided with springs through which the pressure of the links upon the disk is transmitted so that the disk is normally held by spring pressure against the mouth of the valve body, substantially as described.

3. A valve having, in combination, a valve body having a straight passage terminating in an inclined mouth, a valve disk pivotally supported upon the valve body and external thereto, a rock shaft mounted externally upon the body and provided with crank arms, resilient linkage connecting the valve disk and crank arms, the length of the crank arms and links and the position of the rock shaft being such with relation to the valve mouth that when the rock shaft is turned to cause the disk to be drawn against the mouth of the valve body the crank arms will swing into the plane of the links and between them thereby locking the valve disk against the mouth of the valve body by spring pressure, substantially as described.

4. A valve having, in combination, a valve body provided with a passage terminating in an inclined mouth, a valve disk for closing the mouth, an ear mounted on the end of the valve body and projecting outwardly therefrom beyond the valve mouth, a link pivotally supported at one end upon the ear and pivotally carrying upon its other end said valve disk, the valve body being provided with external ears located at a distance from the valve mouth and on the side of the valve body opposite the mouth, a rock shaft supported in said ears, crank arms mounted on the rock shaft, links connecting the crank arms and valve disk, and a handle mounted on the rock shaft by which the valve disk may be opened and closed, substantially as described.

ALFRED E. SMITH.

Witnesses:
  HORACE VAN EMREN,
  GEO. E. STEBBINS.